US012020621B2

(12) United States Patent
Kim et al.

(10) Patent No.: US 12,020,621 B2
(45) Date of Patent: Jun. 25, 2024

(54) DISPLAY DEVICE AND METHOD FOR CONTROLLING SAME

(71) Applicant: Samsung Electronics Co., Ltd., Suwon-si (KR)

(72) Inventors: Kwangdon Kim, Suwon-si (KR); Jaesung Lee, Suwon-si (KR); Tammy Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/710,074

(22) Filed: Mar. 31, 2022

(65) Prior Publication Data

US 2022/0223090 A1 Jul. 14, 2022

Related U.S. Application Data

(63) Continuation of application No. PCT/KR2020/012875, filed on Sep. 23, 2020.

(30) Foreign Application Priority Data

Oct. 2, 2019 (KR) ........................ 10-2019-0122503

(51) Int. Cl.
*G09G 3/20* (2006.01)

(52) U.S. Cl.
CPC ... *G09G 3/2003* (2013.01); *G09G 2320/0626* (2013.01); *G09G 2320/0666* (2013.01)

(58) Field of Classification Search
CPC ... G09G 2320/0242; G09G 2320/0626; G09G 2320/0666; G09G 2320/0693;
(Continued)

(56) References Cited

U.S. PATENT DOCUMENTS 6,342,897 B1 1/2002 Wen
9,055,283 B2 6/2015 Chen et al.
(Continued)

FOREIGN PATENT DOCUMENTS

CN 110197642 A 9/2019
JP H11-355798 A 12/1999
(Continued)

OTHER PUBLICATIONS

Extended European Search Report dated Oct. 5, 2022, issued in European Patent Application No. 20873042.4.
Ziquan Zhao et al., "An accuracy requirement analysis for LED brightness and color correction system", IEEE, 2011 International Conference on Transportation, Mechanical, and Electrical Engineering (TMEE), Dec. 16-18, 2011, Changchun, China.
(Continued)

*Primary Examiner* — Kenneth Bukowski
(74) *Attorney, Agent, or Firm* — Jefferson IP Law, LLP

(57) ABSTRACT

A method of controlling an element of a display device is provided. At least one processor of the display device may be configured to determine a first chromaticity value corresponding to a first grayscale value of the element of the display device, and determine a first luminance value corresponding to the first chromaticity value, based on the first chromaticity value and a target with respect to a relationship between chromaticity and luminance. In addition, the at least one processor of the display device may be configured to determine a second grayscale value corresponding to the first luminance value, determine a second chromaticity value corresponding to the second grayscale value, determine a second luminance value corresponding to the second chromaticity value, based on the second chromaticity value and the target, and determine chromaticity and luminance calibration coefficients, based on the second luminance value.

15 Claims, 12 Drawing Sheets

(58) Field of Classification Search
CPC .... G09G 2340/06; G09G 3/2003; G09G 3/32; G09G 5/02
See application file for complete search history.

(56) References Cited

U.S. PATENT DOCUMENTS

| | | | | |
|---|---|---|---|---|
| 9,401,106 | B2 | 7/2016 | Choi | |
| 10,708,533 | B2 | 7/2020 | Cho et al. | |
| 2007/0146266 | A1 | 6/2007 | Yasuda et al. | |
| 2016/0321979 | A1 | 11/2016 | Chaji et al. | |
| 2017/0330498 | A1 | 11/2017 | Orio et al. | |
| 2019/0213941 | A1* | 7/2019 | Beon | G09G 3/2003 |
| 2021/0166606 | A1* | 6/2021 | Han | G09G 3/006 |

FOREIGN PATENT DOCUMENTS

| | | | |
|---|---|---|---|
| JP | 2019-003128 | A | 1/2019 |
| KR | 10-2017-0041559 | A | 4/2017 |
| KR | 10-2018-0050054 | A | 5/2018 |
| KR | 10-2018-0062571 | A | 6/2018 |

OTHER PUBLICATIONS

International Search Report and Written Opinion dated Dec. 30, 2020, issued in International Patent Application No. PCT/KR2020/012875.

Korean Office Action dated Mar. 5, 2024, issued in Korean Patent Application No. 10-2019-0122503.

* cited by examiner

FIG. 3

300, 310, 320

$$\begin{bmatrix} RY_{i+1,R} \\ GY_{i+1,R} \\ BY_{i+1,R} \end{bmatrix} = \begin{bmatrix} \frac{Rx_i}{Ry_i} & \frac{Gx_i}{Gy_i} & \frac{Bx_i}{By_i} \\ 1 & 1 & 1 \\ \frac{Rz_i}{Ry_i} & \frac{Gz_i}{Gy_i} & \frac{Bz_i}{By_i} \end{bmatrix}^{-1} \begin{bmatrix} X_{targetR} \\ Y_{targetR} \\ Z_{targetR} \end{bmatrix}$$

330, 340, 350

$$\begin{bmatrix} RY_{i+1,G} \\ GY_{i+1,G} \\ BY_{i+1,G} \end{bmatrix} = \begin{bmatrix} \frac{Rx_i}{Ry_i} & \frac{Gx_i}{Gy_i} & \frac{Bx_i}{By_i} \\ 1 & 1 & 1 \\ \frac{Rz_i}{Ry_i} & \frac{Gz_i}{Gy_i} & \frac{Bz_i}{By_i} \end{bmatrix}^{-1} \begin{bmatrix} X_{targetG} \\ Y_{targetG} \\ Z_{targetG} \end{bmatrix}$$

360, 370, 380

$$\begin{bmatrix} RY_{i+1,B} \\ GY_{i+1,B} \\ BY_{i+1,B} \end{bmatrix} = \begin{bmatrix} \frac{Rx_i}{Ry_i} & \frac{Gx_i}{Gy_i} & \frac{Bx_i}{By_i} \\ 1 & 1 & 1 \\ \frac{Rz_i}{Ry_i} & \frac{Gz_i}{Gy_i} & \frac{Bz_i}{By_i} \end{bmatrix}^{-1} \begin{bmatrix} X_{targetB} \\ Y_{targetB} \\ Z_{targetB} \end{bmatrix}$$

DISPLAY DEVICE AND METHOD FOR CONTROLLING SAME

CROSS-REFERENCE TO RELATED APPLICATION(S)

This application is a continuation application, claiming priority under § 365(c), of an International application No. PCT/KR2020/012875, filed on Sep. 23, 2020, which is based on and claims the benefit of a Korean patent application number 10-2019-0122503, filed on Oct. 2, 2019, in the Korean Intellectual Property Office, the disclosure of which is incorporated by reference herein in its entirety.

BACKGROUND

1. Field

The disclosure relates to a display device for displaying an image, and a method of controlling the same. More particularly, the disclosure relates to a display device capable of calibrating the uniformity of elements of the display device by calculating calibration coefficients for each element and applying the calibration coefficients to image signals in order to perform the uniformity calibration of the elements of the display device, and a method of controlling the same.

2. Description of Related Art

A display device includes a display panel for displaying an image, and thus is capable of displaying an image based on broadcast signals or image signal/image data in various formats, and is implemented as a television (TV) or a monitor. Various types of display panel may be implemented, such as a liquid crystal panel or a plasma panel, according to characteristics thereof, and may be applied to various display devices.

The display device includes a plurality of elements, which respectively generate light of different wavelengths and intensities according to their processes. At this time, luminance and chromaticity, which are light outputs, are respectively and differently generated by the elements in a reproduced image. Consequently, slightly different colors may be reproduced with respect to the same input image signal. In addition, when light outputs of the respective elements of a high-resolution display device are not uniform, an issue such as screen blurring may occur.

In order to solve this issue, there is an increasing need for calibration that makes light output of respective elements of a display device uniform.

Although conventional technologies have been used to calculate chromaticity and luminance calibration coefficients for the uniformity of elements and apply the calibration coefficients to an image, when the luminance is changed, the chromaticity is also changed, and thus, it is impossible to perform accurate calibration.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a display device for displaying an image and a method of controlling the same.

Additional aspects will be set forth in part in the description which follows and, in part, will be apparent from the description, or may be learned by practice of the presented embodiments.

In accordance with an aspect of the disclosure, a method of controlling an element of a display device is provided. The method includes determining a first chromaticity value corresponding to a first grayscale value of the element, determining a first luminance value corresponding to the first chromaticity value, based on the first chromaticity value and a target with respect to a relationship between chromaticity and luminance, determining a second grayscale value corresponding to the first luminance value, determining a second chromaticity value corresponding to the second grayscale value, determining a second luminance value corresponding to the second chromaticity value, based on the second chromaticity value and the target, and determining chromaticity and luminance calibration coefficients, based on the second luminance value.

According to an embodiment of the disclosure, the method of controlling an element of a display device may further include applying the calibration coefficients to chromaticity and luminance components of a pixel value corresponding to the element.

According to an embodiment of the disclosure, the calibration coefficients may include a ratio of the second luminance value to luminance corresponding to a maximum grayscale value.

According to an embodiment of the disclosure, the method of controlling an element of a display device may further include determining the first chromaticity value corresponding to the first grayscale value by using grayscale-chromaticity modeling.

According to an embodiment of the disclosure, the method of controlling an element of a display device may further include determining the second grayscale value corresponding to the first luminance value by using grayscale-luminance modeling.

According to an embodiment of the disclosure, the determining of the calibration coefficients may be performed until a difference between a reference chromaticity value and the second chromaticity value or a difference between a reference luminance value and the second luminance value is less than or equal to a threshold value.

In accordance with another aspect of the disclosure, a display device is provided. The display device includes a memory, and at least one processor, and the at least one processor may be configured to determine a first chromaticity value corresponding to a first grayscale value of an element of the display device, determine a first luminance value corresponding to the first chromaticity value, based on the first chromaticity value and a target with respect to a relationship between chromaticity and luminance, determine a second grayscale value corresponding to the first luminance value, determine a second chromaticity value corresponding to the second grayscale value, determine a second luminance value corresponding to the second chromaticity value, based on the second chromaticity value and the target, and determine chromaticity and luminance calibration coefficients, based on the second luminance value.

In accordance with another aspect of the disclosure, a computer-readable recording medium may store instructions for controlling an element of a display device is provided.

The instructions cause the display device to determine a first chromaticity value corresponding to a first grayscale value of the element, determine a first luminance value corresponding to the first chromaticity value, based on the first chromaticity value and a target with respect to a relationship between chromaticity and luminance, determine a second grayscale value corresponding to the first luminance value, determine a second chromaticity value corresponding to the second grayscale value, determine a second luminance value corresponding to the second chromaticity value, based on the second chromaticity value and the target, and determine chromaticity and luminance calibration coefficients, based on the second luminance value.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 is a diagram illustrating an example of obtaining luminance values based on a target and chromaticity values, according to an embodiment of the disclosure;

The same reference numerals are used to represent the same elements throughout the drawings.

DETAILED DESCRIPTION

Figure 1:
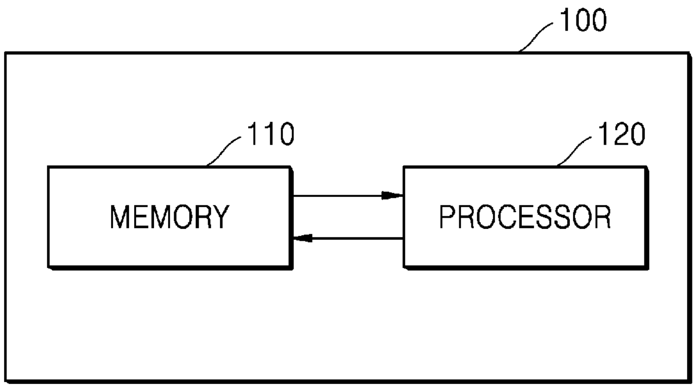
FIG. 1 is a block diagram illustrating a display device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, in the drawings, parts irrelevant to the description are omitted in order to clearly describe the embodiments of the disclosure, and like reference numerals designate like elements throughout the specification. Throughout the specification, when a part is referred to as being "connected to" another part, it may be "directly connected to" the other part or be "electrically connected to" the other part through an intervening element. Throughout the specification, when a part "includes" a component, it means that the part may additionally include other components rather than excluding other components as long as there is no particular opposing recitation. In addition, as used herein, the term "unit" refers to a software element or a hardware element, such as a field programmable gate array (FPGA) or an application-specific integrated circuit (ASIC), which performs a certain function. However, the "unit" does not always have a meaning limited to software or hardware. The "unit" may be configured either to be stored in an addressable storage medium or to execute one or more processors. Thus, for example, the term "unit" may include components such as software components, object-oriented software components, class components and task components, processes, functions, attributes, procedures, subroutines, segments of program code, drivers, firmware, micro-code, circuits, data, a database, data structures, tables, arrays, and variables. Functions provided by the components and "units" may be combined into the smaller number of components and "units", or may be divided into additional components and "units".

The term "exemplary" is used as the meaning of "used as an example" throughout the specification. Any embodiment described herein as "exemplary" is by no means necessarily to be interpreted as being preferred or having advantages over other embodiments.

Hereinafter, preferred embodiments of the disclosure will be described with reference to the accompanying drawings.

FIG. 1 is a block diagram illustrating a display device according to an embodiment of the disclosure.

Referring to FIG. 1, a display device 100 may include a memory 110 and a processor 120.

The memory 110 may store grayscale-chromaticity modeling data, grayscale-luminance modeling data, algorithm data for determining calibration coefficients, a reference chromaticity value, a reference luminance value, and the like with respect to all elements (e.g., light-emitting diode (LED) elements) of the display device 100. The memory 110 may be connected to the processor 120, and thus data stored in the memory 110 may be transmitted to the processor 120 if necessary. If necessary, the processor 120 may perform various operations for uniformity calibration of the elements by using data information stored in the memory 110.

By the processor 120, the calibration coefficients may be determined for each element with respect to all pixels, and the determined calibration coefficients are applied to chromaticity and luminance components of each element to calibrate the uniformity of the elements. The term "uniformity of elements" used herein refers to the uniformity of measured luminance, chromaticity, or luminance and chromaticity of light output from each element, and the term "uniformity calibration" refers to application of calibration coefficients to the luminance and chromaticity components of each element such that light of certain levels of luminance and chromaticity is output when each element emits light of a certain grayscale value. Accordingly, when grayscale values of the elements, the uniformity of which is calibrated, are equally changed, the luminance and chromaticity levels of light output from all of the elements may be changed to the same levels.

The memory 110 is required to store data even when power supplied to the display device 100 is cut off, and may be provided as a writable non-volatile memory (a writable read-only memory (ROM)) to reflect modifications. That is, the memory 110 may be provided as any one of flash memory, erasable programmable read-only memory (EPROM), and electronically erasable programmable ready-only memory (EEPROM). In the embodiment, although it is described, for convenience of description, that the grayscale-chromaticity modeling data, the grayscale-luminance modeling data, the algorithm data for determining calibration coefficients, and the like with respect to all elements are stored in one memory 110, the disclosure is not limited thereto, and the display device 100 may include a plurality of memories for storing calibration coefficients corresponding to each element.

The processor 120 controls the overall operation of the display device 100. For example, before determining the calibration coefficients, the processor 120 may set a target with respect to a relationship between chromaticity and luminance. In the disclosure, the calibration coefficients may include the ratio of a finally determined luminance value to the luminance corresponding to the maximum grayscale value, but this is for matching them with a calibration framework of the elements for uniformity calibration, and thus the calibration coefficients are not necessarily limited to the ratio of a luminance value. In addition, the target refers to ocular response values with respect to a chromaticity value and a luminance value corresponding to a certain grayscale value, that color receptors in an eye need to recognize so that the eye can identify a correct color.

The processor 120 may determine a first chromaticity value corresponding to a first grayscale value, determine a first luminance value based on the first chromaticity value and the target, and determine a second grayscale value corresponding to the first luminance value. Thereafter, the processor 120 may determine a second chromaticity value corresponding to the second grayscale value, and thus determine a second luminance value based on the second chromaticity value and the target. When the second luminance value is determined, the processor 120 may determine chromaticity and luminance calibration coefficients based on the second luminance value.

In addition, the processor 120 may determine the calibration coefficients a defined number of times or determine the calibration coefficients until the difference between a reference chromaticity value and a finally determined chromaticity value or the difference between a reference luminance value and a finally determined luminance value is less than or equal to a threshold value. In addition, the processor 120 of the disclosure may perform all operations described below. A method of determining calibration coefficients will be described in detail with reference to FIGS. 5 to 7, 8A, and 8B.

Figure 2A:
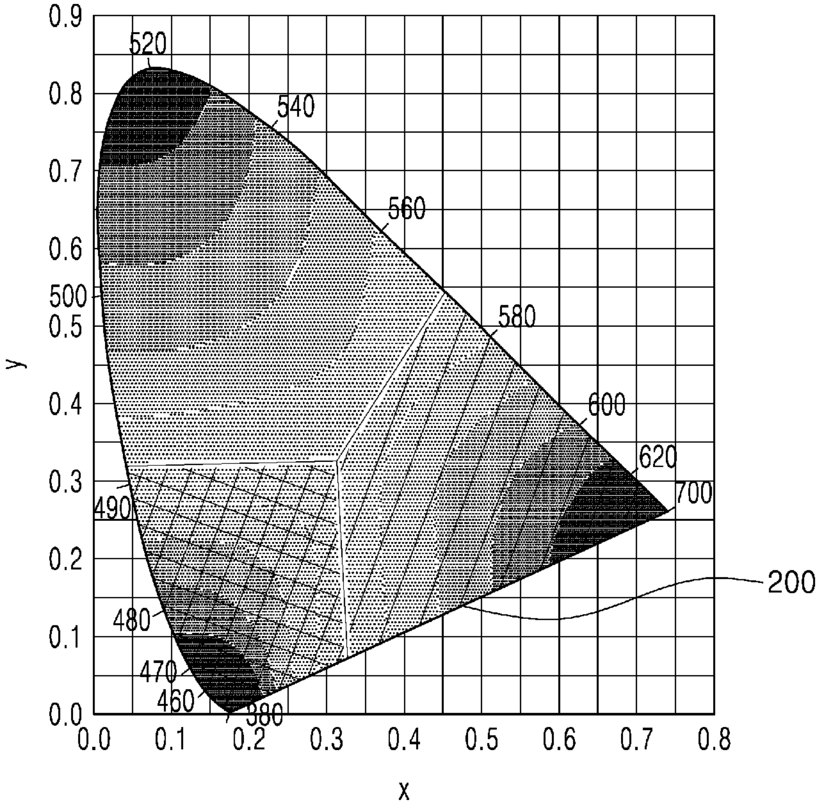
FIG. 2A is a chromaticity diagram that is recognizable by an eye, according to an embodiment of the disclosure.

FIG. 2A is a chromaticity diagram that is recognizable by an eye, according to an embodiment of the disclosure.

An eye may recognize a certain color through a combination of chromaticity and luminance by using three color receptors. Here, reaction values of the receptors with respect to the chromaticity and the luminance may be converted into X, Y, and Z. A reaction value (X, Y, Z), a chromaticity value (x, y), and a luminance value (Y) may satisfy Equation 1:

Equation 1

$$x = \frac{X}{X+V+Z} \qquad X = \frac{y}{y}x,$$
$$y = \frac{Y}{X+Y+Z} \quad \Longleftrightarrow \quad Z = \frac{y}{y}z,$$
$$z = \frac{Z}{X+Y+Z} = 1 - x - y$$

Referring to FIG. 2A, a chromaticity diagram 200 shows colors recognized by the eye according to chromaticity values (x, y). Accordingly, a target with respect to the relationship between chromaticity and luminance may correspond to a certain point of the chromaticity diagram 200.

Figure 2B:
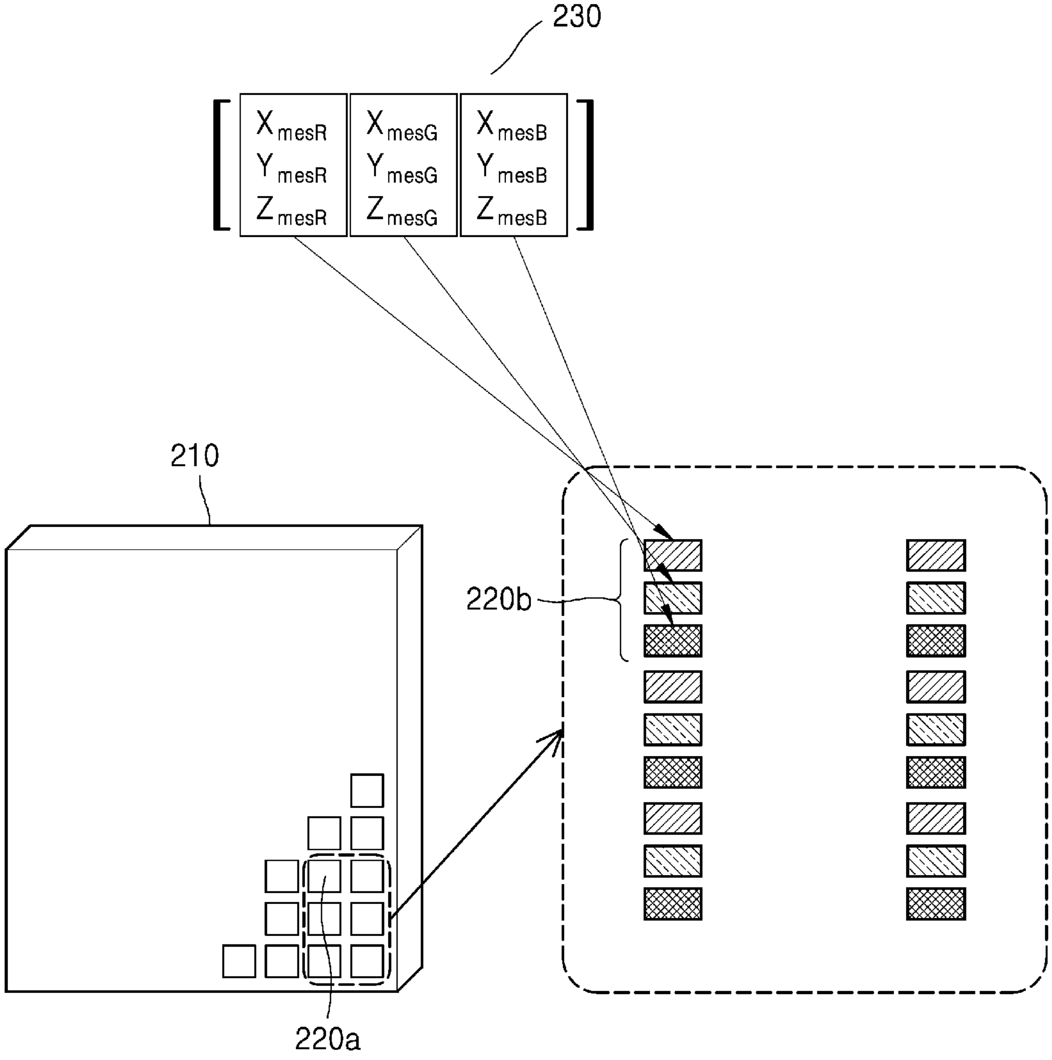
FIG. 2B is a diagram illustrating R, G, and B components with respect to each element, according to an embodiment of the disclosure.

FIG. 2B is a diagram illustrating R, G, and B components with respect to each element, according to an embodiment of the disclosure.

Each element of the display device 100 may emit light of red (R), green (G), and blue (B) colors, and an R component value is input to an R LED, a G component value is input to a G LED, and a B component value is input to a B LED. Based on respective component values, light outputs of the R LED, the G LED, and the B LED are added together to generate light outputs emitting various colors.

Referring to FIG. 2B, a display panel 210 of the display device 100 includes a plurality of pixels, and each pixel 220*a* corresponds to an element. Each pixel 220*a* includes an R LED, a G LED, and a B LED 220*b* that output R, G, and B colors, respectively. A matrix 230 denotes ocular response values corresponding to measured current chromaticity values and luminance values with respect to light outputs of the R LED, the G LED, and the B LED of a certain pixel. For example, a measuring instrument (not shown) may measure current chromaticity values and luminance values from light outputs of the R LED, the G LED, and the B LED 220*b* of the pixel 220*a*, and ocular response values corresponding to the measured chromaticity value and luminance value of the R LED may be $X_{mesR}$, $Y_{mesR}$, and $Z_{mesR}$.

Figure 2C:
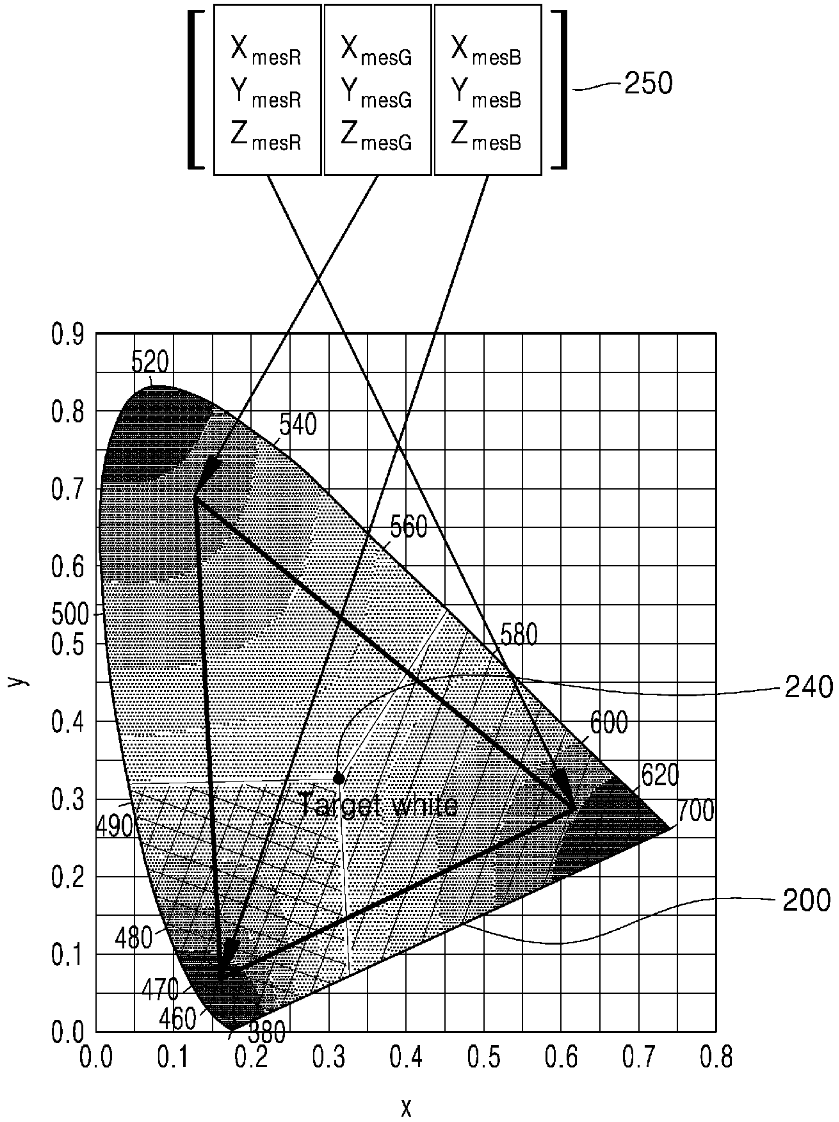
FIG. 2C is a diagram illustrating chromaticity values and luminance values corresponding to a chromaticity diagram, according to an embodiment of the disclosure.

FIG. 2C is a diagram illustrating ocular response values corresponding to a chromaticity diagram, according to an embodiment of the disclosure.

Referring to FIG. 2C, in order for elements to output desired colors and guarantee their uniformity, target white 240 needs to be output when the maximum light outputs of R LED, G LED, and B LED are added together. A matrix 250 denotes ocular response values corresponding to chromaticity values and luminance values of the R LED, G LED, and B LED, respectively, for outputting the target white 240. For example, when receptors recognize light output from a preferred R LED, the ocular response values may be $X_{tgt,R}$, $Y_{tgt,R}$, and $Z_{tgt,R}$ of the matrix 250.

Figure 2D:
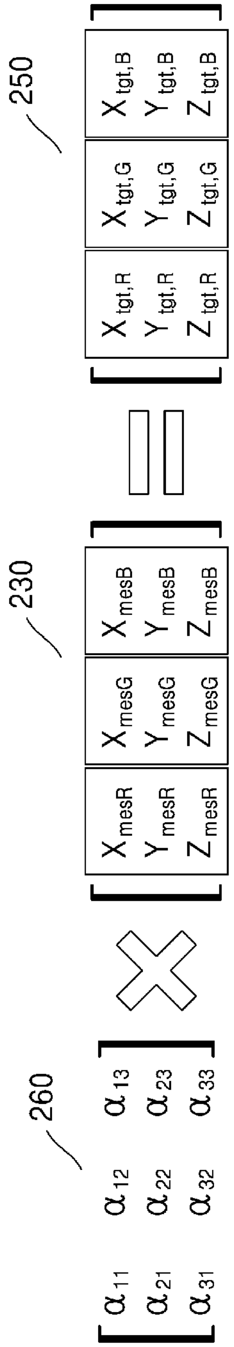
FIG. 2D is a diagram illustrating an example of applying calibration coefficients to chromaticity and luminance components of an element, according to an embodiment of the disclosure.

FIG. 2D is a diagram illustrating an example of applying calibration coefficients to chromaticity and luminance components of an element, according to an embodiment of the disclosure.

Referring to FIG. 2D, when calibration coefficients 260 for calibrating the uniformity of an element are determined, the processor 120 may apply the calibration coefficients 260 to the chromaticity and luminance components corresponding to the element. The result of applying the calibration coefficients 260 as illustrated. For example, by performing an operation between the matrix 230 of the ocular response values corresponding to the measured current chromaticity values and luminance values of the R LED, the G LED, and the B LED of the element, and the calibration coefficients 260, the matrix 250 of the ocular response values corresponding to chromaticity values and luminance values of the R LED, the G LED, and the B LED for outputting the target white 240 may be derived. The calibration coefficients 260 may have dimensions of 3×3 in order to derive the matrix 250 by performing the operation between the calibration coefficients 260 and the matrix 230.

According to an embodiment of the disclosure, the target values may be ocular response values corresponding to chromaticity and luminance on the chromaticity diagram 200 that the element needs to realize. For example, the target values may have a form of a 3×1 matrix corresponding to each column in the matrix 250.

In the disclosure, the target values may be, but are not limited to, ocular response values with respect to chromaticity and luminance components of light outputs from the R LED, the G LED, and the B LED for realizing the target white 240. The target may be a certain point on the chromaticity diagram 200 at which all elements may produce the same output for the same input.

A chromaticity value (x, y) (e.g., R, G, and B points on the chromaticity diagram 200 corresponding to the matrix 250) for configuring the target white 240 may be determined. Thereafter, luminance values of the R LED, the G LED, and the B LED for configuring the target white 240 may be determined through Equation 2, Equation 3, and Equation 4.

$$X_{tgt,W}=X_{tgt,R}+X_{tgt,G}+X_{tgt,B}$$

$$Y_{tgt,W}=Y_{tgt,R}+Y_{tgt,G}+Y_{tgt,B}$$

$$Z_{tgt,W}=Z_{tgt,R}+Z_{tgt,G}+Z_{tgt,B} \qquad \text{Equation 2}$$

As may be seen from Equation 2, in order to obtain the target of the disclosure, $Y_{tgt,R}$, $Y_{tgt,G}$, and $Y_{tgt,B}$, which are luminance values of the R LED, the G LED, and the B LED, respectively, need to be determined.

By applying Equation 1 to remove constants and luminance values, which are unknown, Equation 3 may be obtained.

$$X_{tgt,W}=Y_{tgt,R}\times x_{tgt,R}/y_{tgt,R}+Y_{tgt,G}\times x_{tgt,G}/y_{tgt,G}+Y_{tgt,B}\times x_{tgt,B}/y_{tgt,B}$$

$$Y_{tgt,W}=Y_{tgt,R}+Y_{tgt,G}+Y_{tgt,B}$$

$$Z_{tgt,W}=Y_{tgt,R}\times z_{tgt,R}/y_{tgt,R}+Y_{tgt,G}\times z_{tgt,G}/y_{tgt,G}+Y_{tgt,B}\times z_{tgt,B}/y_{tgt,B} \qquad \text{Equation 3}$$

Thereafter, by converting Equation 3 into a matrix, Equation 4 may be obtained.

$$\begin{bmatrix} Y_{tgt,R} \\ Y_{tgt,G} \\ Y_{tgt,B} \end{bmatrix} = \begin{bmatrix} x_{tgt,R}/y_{tgt,R} & x_{tgt,G}/y_{tgt,G} & x_{tgt,B}/y_{tgt,B} \\ 1 & 1 & 1 \\ x_{tgt,R}/y_{tgt,R} & x_{tgt,G}/y_{tgt,G} & x_{tgt,B}/y_{tgt,B} \end{bmatrix}^{-1} \begin{bmatrix} X_{tgtW} \\ Y_{tgtW} \\ Z_{tgtW} \end{bmatrix} \qquad \text{Equation 4}$$

As may be seen from Equation 4, when the target is determined, the target luminance values $Y_{tgt,R}$, $Y_{tgt,G}$, and $Y_{tgt,B}$ of the R LED, the G LED, and the B LED for realizing the target may be obtained from the chromaticity value and the target, which are constants.

FIG. 3 is a diagram illustrating an example of obtaining luminance values based on a target and chromaticity values, according to an embodiment of the disclosure.

Referring to FIG. 3, according to an embodiment of the disclosure, luminance values of an R LED, a G LED, and a B LED for realizing the target, based on the target and the chromaticity value may be obtained through Equation 4. For example, a matrix 320 may denote ocular response values corresponding to a chromaticity value and a luminance value with respect to a target R color. Chromaticity values of the R LED, the G LED, and the B LED with respect to the target R color, which are constants, may be determined as a matrix 310, and ocular response values with respect to luminance components of light outputs of the R LED, the G LED, and the B LED for realizing the target R color may be obtained as a matrix 300 through matrix calculation. Accordingly, $RY_{i+1,R}$ of the matrix 300 may be an ocular response value with respect to a luminance component of a light output of the R LED for realizing the target R color, $GY_{i+1,R}$ may be an ocular response value with respect to a luminance component of a light output of the G LED for realizing the target R color, and $BY_{i+1,R}$ may be an ocular response value with respect to a luminance component of a light output of the B LED for realizing the target R color.

Similar to obtaining the matrix 300 to realize the target R color, when a target G color is determined, by performing matrix calculation on a matrix 350 representing ocular response values corresponding to a chromaticity value and a luminance value with respect to the target G color and a matrix 340 representing chromaticity values of the R LED, the G LED, and the B LED, ocular response values with respect to luminance components of light outputs of the R LED, the G LED, and the B LED for realizing the target R color may be obtained as a matrix 330. Accordingly, $RY_{i+1,G}$ of the matrix 330 may be an ocular response value with respect to a luminance component of a light output of the R LED for realizing the target G color, $GY_{i+1,G}$ may be an ocular response value with respect to a luminance component of a light output of the G LED for realizing the target G color, and $BY_{i+1,G}$ may be an ocular response value with respect to a luminance component of a light output of the B LED for realizing the target G color. In order to realize the target B color, the processor 120 may obtain matrices 360, 370, and 380 in the same manner as that for realizing the target R and G colors.

In order for the elements to correctly output light, processor 120 may determine the target white 240 as a reference target, and may determine target R, G, and B colors for realizing the target white 240. When the R LED, the G LED, and the B LED output light according to the target R, G, and B colors, the eye may recognize a white color.

Figure 4:
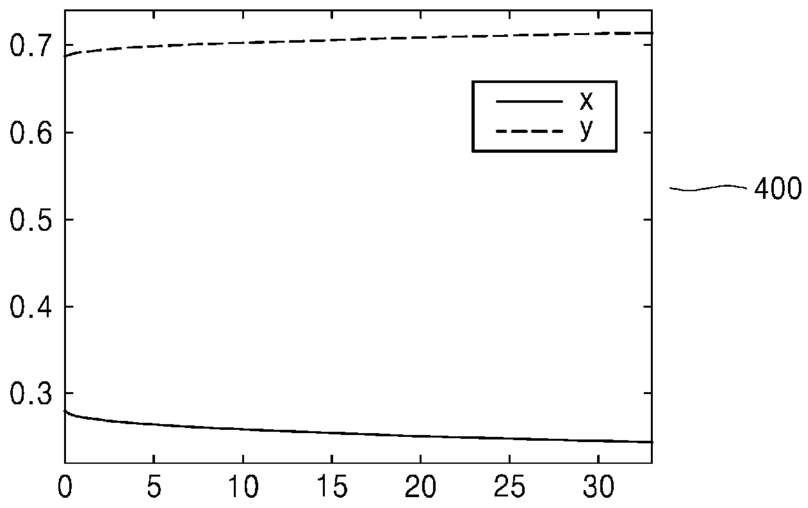
FIG. 4 is a diagram illustrating a relationship between luminance and chromaticity according to an embodiment of the disclosure.

FIG. 4 is a diagram illustrating a relationship between luminance and chromaticity according to an embodiment of the disclosure.

A graph 400 shows a change in a chromaticity value with respect to a luminance value of an actual element. Referring to FIG. 4, when a target of the actual device is determined and thus a luminance component is calibrated, a chromaticity component (x, y) is also changed. Accordingly, a result that is slightly different from the initially determined target may be obtained.

Therefore, in order to realize the initially determined target, even in an environment in which both luminance and chromaticity are changed, it is necessary to determine the calibration coefficients by individually considering the grayscale-chromaticity relationship and the grayscale-luminance relationship. Hereinafter, a method of determining calibration coefficients will be described in detail with reference to FIGS. 5, 6 7, 8A, and 8B.

Figure 5:
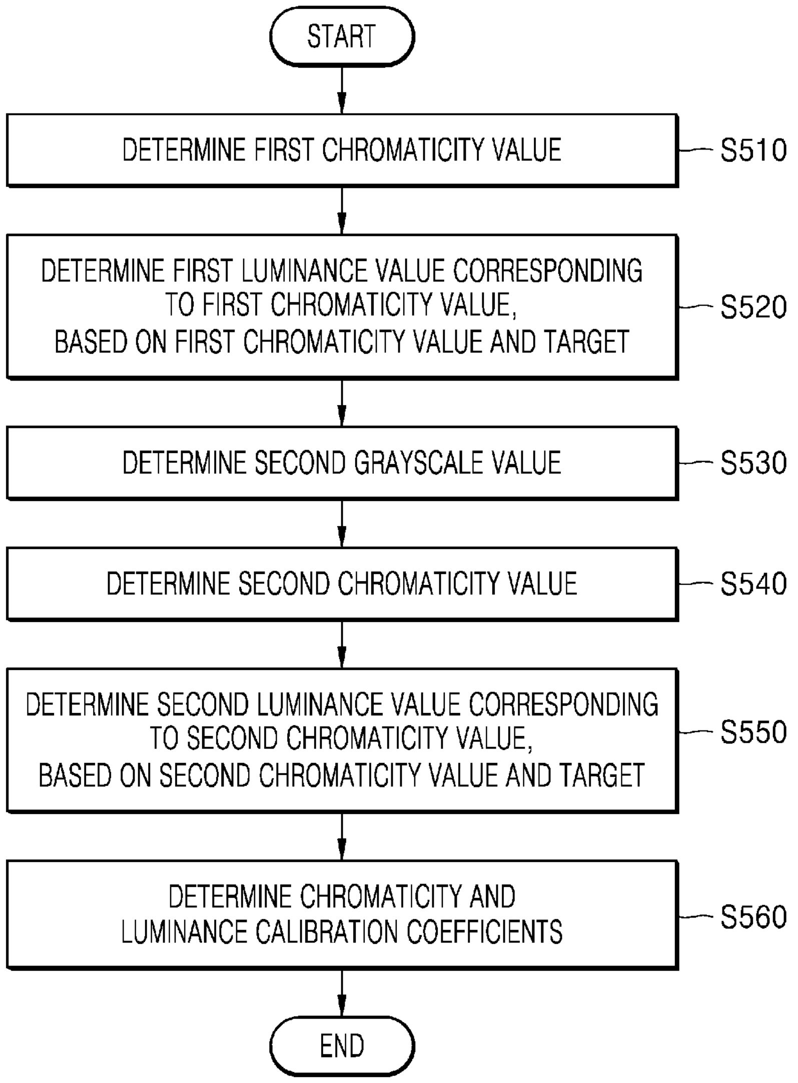
FIG. 5 is a flowchart illustrating a process of determining chromaticity and luminance calibration coefficients, according to an embodiment of the disclosure.

FIG. 5 is a flowchart illustrating a process of determining chromaticity and luminance calibration coefficients, according to an embodiment of the disclosure.

First, in order to determine calibration coefficients according to an embodiment of the disclosure, grayscale-chromaticity modeling and grayscale-luminance modeling with respect to all pixels may be required for each element. The grayscale-chromaticity modeling may be performed by measuring a chromaticity value corresponding to a grayscale value input to each element, and the grayscale-luminance modeling may be performed by measuring a luminance value corresponding to the grayscale value input to each element.

Grayscale-chromaticity and grayscale-luminance modeling methods may include a method of measuring all chromaticity values and luminance values corresponding to all grayscale values (0 to 255) for each element, or measuring a chromaticity value and a luminance value corresponding to a certain grayscale value and interpolating chromaticity values and luminance values corresponding to the remaining grayscale values through a power function in an alpha-beta form. When the grayscale-chromaticity modeling and the grayscale-luminance modeling are determined, the memory 110 may store modeling data, and the processor 120 may use the stored modeling data to determine the calibration coefficients.

Referring to FIG. 5, in operation S510, the processor 120 may determine a first chromaticity value corresponding to a first grayscale value of an element by using the grayscale-chromaticity modeling. Because certain chromaticity values corresponding to respective grayscale values of the grayscale-chromaticity modeling are linear and have a one-to-one matching relationship with the grayscale values, one chromaticity value may correspond to one grayscale value.

In addition, because grayscale values input to an R LED, a G LED, and a B LED may be different for each element, the total number of first chromaticity values determined by using the grayscale-chromaticity modeling may be 9. In detail, the processor 120 may determine a chromaticity value (x, y, z) for each of the R LED, the G LED, and the B LED when different first grayscale values are input to each of the R LED, the G LED, and the B LED. For example, when the first grayscale value of the R LED is input, the processor 120 may determine a chromaticity value ($R_x$, $R_y$) corresponding to the input first grayscale value of the R LED by using the grayscale-chromaticity modeling, and determine a first chromaticity value ($R_x$, $R_y$, $R_z$) of the R LED through Equation 1. Similarly, the processor 120 may determine a first chromaticity value ($G_x$, $G_y$, $G_z$) of the G LED and a first chromaticity value ($B_x$, $B_y$, $B_z$) of the B LED.

When the first chromaticity value is determined, in operation S520, the processor 120 may determine a first luminance value corresponding to the first chromaticity value, from the determined first chromaticity value and a target through Equation 4. The determined first luminance value may be an ocular response value with respect to a luminance component of a light output.

The first luminance value determined through matrix calculation may be a luminance value of each of the R LED, the G LED, and the B LED for realizing the target, and may be in the form of a 3×1 matrix.

When the first luminance value is determined, in operation S530, the processor 120 may determine a second grayscale value corresponding to the first luminance value by using grayscale-luminance modeling.

Because second grayscale values corresponding to first luminance values of the grayscale-luminance modeling are linear and have a one-to-one matching relationship with the first luminance values, one grayscale value may correspond to one luminance value. In addition, because the determined first luminance value may be different for each of the R LED, the G LED, and the B LED, the total number of second luminance values determined by using the grayscale-luminance modeling may be 3.

When the second grayscale value is determined, in operation S540, the processor 120 may determine a second chromaticity value corresponding to the second grayscale value of the element by using the grayscale-chromaticity modeling. The method of determining a second chromaticity value is the same as the method of determining a first chromaticity value, and thus a detailed description thereof is omitted.

When the second chromaticity value is determined, in operation S550, the processor 120 may determine a second luminance value corresponding to the second chromaticity value, from the determined second chromaticity value and the target through Equation 4 in the same manner as in operation S520.

When the second luminance value is determined, in operation S560, the processor 120 may determine chromaticity and luminance calibration coefficients from the determined second luminance value. The calibration coefficients for uniformity calibration may include the ratio of the second luminance value to a luminance value corresponding to the maximum grayscale value. In detail, because the R LED, the G LED, and the B LED may have different second luminance values, calibration coefficients determined based on one target may include a total of three elements. Accordingly, when three targets, i.e., a target R color, a target G color, and a target B color, are determined based on the target white, the determined calibration coefficients may include a total of nine elements.

The nine elements for determining the calibration coefficients are luminance values with respect to light that each of the R LED, the G LED, and the B LED need to emit to realize the target R color, the target G color, and the target B color. In detail, when the target R color is determined, the three elements with respect to the target R color may include the ratio of the second luminance value of the R LED to the maximum luminance value of the R LED, the ratio of the second luminance value of the G LED to the maximum luminance value of the G LED, and the ratio of the second luminance value ratio of the B LED to the maximum luminance value of the B LED. Similarly, the six elements with respect to the target G color and the target B color may be determined.

The processor 120 may determine the nine elements for determining the calibration coefficients, as the calibration coefficients in a 3×3 matrix form. The calibration coefficients may include the ratios of the luminance values and may be in the form of a 3×3 matrix, but are not necessarily limited thereto because this is for matching them with a calibration framework of elements for uniformity calibration.

Figure 6:
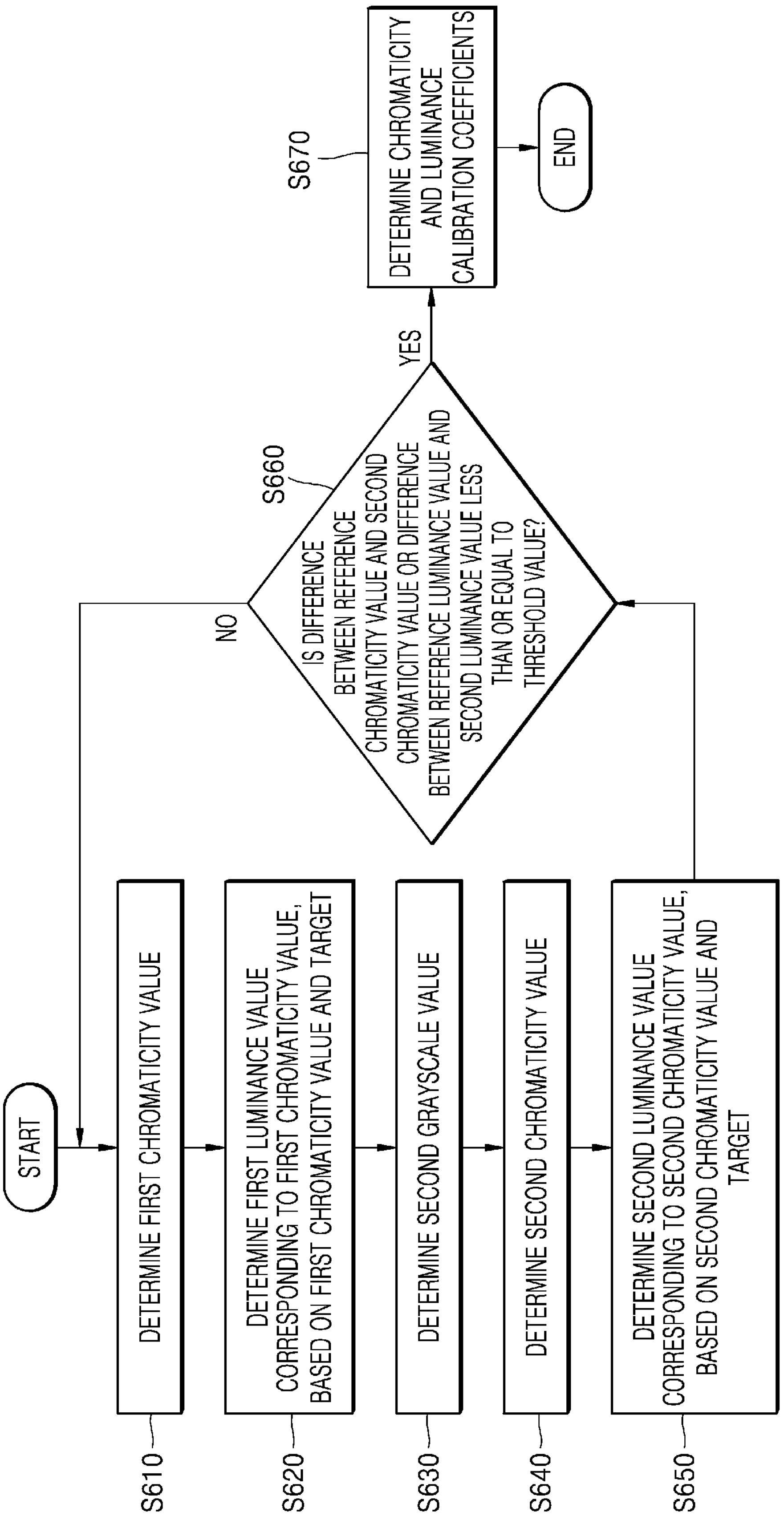
FIG. 6 is a flowchart illustrating a process of determining chromaticity and luminance calibration coefficients, according to an embodiment of the disclosure.

FIG. 6 is a flowchart illustrating a process of determining chromaticity and luminance calibration coefficients, according to an embodiment of the disclosure.

Operations S610 to S650 for determining a first chromaticity value, a second chromaticity value, a first luminance value, a second luminance value, and a second gray scale value are the same as operations S510 to S550, and thus a detailed description thereof is omitted.

When the second luminance value is determined, in operation S660, the processor 120 may determine whether the difference between a reference chromaticity value and the second chromaticity value or the difference between a reference luminance value and the second luminance value is less than or equal to a threshold value.

When the difference between the reference chromaticity value and the second chromaticity value or the difference between the reference luminance value and the second luminance value exceeds the threshold value, the processor 120 may return to operation S610 and iterate operations S610 to S650. When the difference between the reference chromaticity value and the second chromaticity value or the difference between the reference luminance value and the second luminance value is less than or equal to the threshold value, in operation S670, the processor 120 may determine the chromaticity and luminance calibration coefficients. The method of determining calibration coefficients is described in connection with operation S550, and thus a detailed description thereof is omitted.

Referring to FIG. 6, operations S610 to S650 may be iterated to determine a chromaticity value and a luminance value with respect to a target based on the comparison using the reference chromaticity value and the reference luminance value. By iterating operations S610 to S650, the initially determined target may be realized even in an environment in which both luminance and chromaticity are changed, and thus, the uniformity of elements for light outputs of the elements may be calibrated.

In order to determine whether to iterate operations S610 to S650, the processor 120 may determine how many times operations S610 to S650 have been iterated so far. In detail, the processor 120 may determine whether the current second chromaticity value, second grayscale value, or second luminance value is determined by iterating operations S610 to S650 a predefined number of times. Accordingly, when the current second chromaticity value, second grayscale value, or second luminance value is determined through the predefined number of repetitions, in operation S670, the processor 120 may determine the chromaticity and luminance calibration coefficients. On the other hand, when the current second chromaticity value, second grayscale value, or second luminance value is not determined through the predefined number of repetitions, the processor 120 may return to operation S610 and iterate operations S610 to S650.

Figure 7:
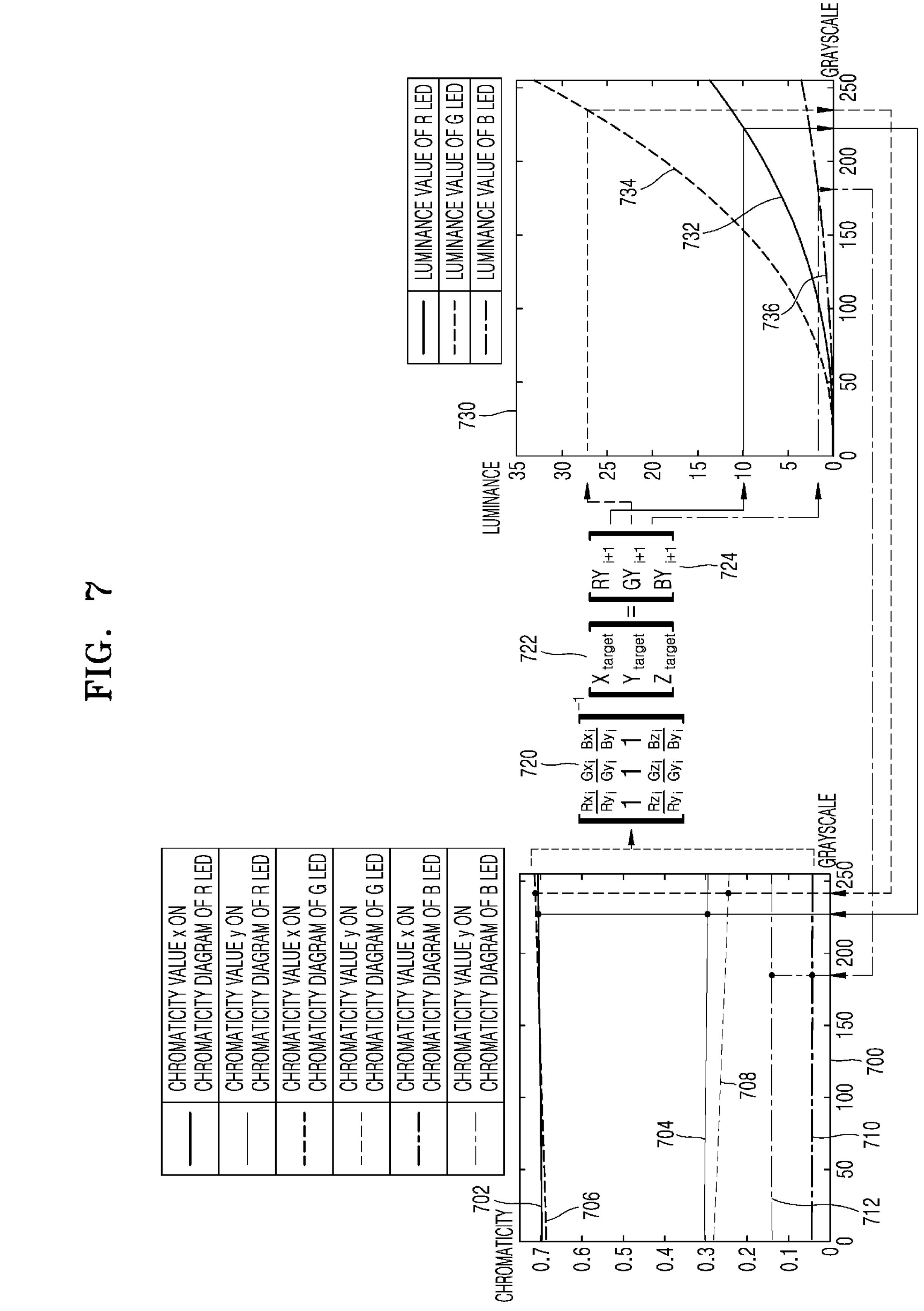
FIG. 7 is a diagram illustrating an example of determining chromaticity values and luminance values, according to an embodiment of the disclosure.

FIG. 7 is a diagram illustrating an example of determining chromaticity values and luminance values, according to an embodiment of the disclosure.

Referring to FIG. 7, when a first grayscale value is input, the processor 120 may determine first chromaticity values of an R LED, a G LED, and a B LED corresponding to the first grayscale value by using grayscale-chromaticity modeling 700. Lines 702, 704, 706, 708, 710, and 712 are obtained by measuring and graphing chromaticity values on the chromaticity diagram 200 corresponding to grayscale values input to a certain element. In detail, the lines 702 and 704 may represent first chromaticity values of the R LED on the chromaticity diagram 200 corresponding to first grayscale values, the lines 706 and 708 may represent first chromaticity values of the G LED on the chromaticity diagram 200 corresponding to the first grayscale values, and the lines 710 and 712 may represent first chromaticity values of the B LED on the chromaticity diagram 200 corresponding to the first grayscale values.

When a chromaticity value on the chromaticity diagram 200 is determined, the processor 120 may determine a chromaticity value (x, y, z) for each of the R LED, the G LED, and the B LED through Equation 1. For example, the processor 120 may determine that the first chromaticity value of the R LED corresponding to the first grayscale value is ($R_{xi}$, $R_{yi}$, $R_{zi}$) corresponding to the first column of a matrix 720 through Equation 1. Similarly, the processor 120 may determine the first chromaticity value ($G_{xi}$, $G_{yi}$, $G_{zi}$) of the G LED and the first chromaticity value ($B_{xi}$, $B_{yi}$, $B_{zi}$) of the B LED corresponding to the first grayscale value. “i” in each chromaticity value may mean that the currently input first grayscale value is an i-th input.

When the first chromaticity value is determined, the processor 120 may determine a first luminance value corresponding to the first chromaticity value by performing matrix calculation on a target 722 and the matrix 720. A matrix 724 may denote the first luminance value of each of the R LED, the G LED, and the B LED corresponding to the first chromaticity value. For example, the first luminance value of a light output that the R LED needs to emit, which corresponds to the first chromaticity value may be $RY_{i+1}$, the first luminance value of a light output that the G LED needs to emit may be $GY_{i+1}$, and the first luminance value of a light output that the B LED needs to emit may be $BY_{i+1}$.

When the first luminance value is determined, the processor 120 may determine a second grayscale value corresponding to the first luminance value by using grayscale-luminance modeling 730. A line 732 is obtained by measuring and graphing luminance values corresponding to grayscale values of the R LED of a certain pixel. Accordingly, when the first luminance value of the R LED is determined, the processor 120 may determine a second luminance value of the R LED from the line 732. Similarly, the processor 120 may determine a second luminance value of the G LED from a line 734, and a second luminance value of the G LED from a line 736.

Referring to the grayscale-chromaticity modeling 700, as a grayscale value is changed from the first grayscale value to the second grayscale value, the chromaticity value corresponding to the grayscale value is also changed. Accordingly, when the second grayscale value is determined, the processor 120 may determine second chromaticity values of the R LED, the G LED, and the B LED corresponding to the second grayscale value again by using the grayscale-chromaticity modeling 700. Thereafter, when the second chromaticity value is determined, the processor 120 may determine a second luminance value by performing matrix calculation on the target and the second chromaticity value.

Referring again to FIG. 7, when a luminance value corresponding to a certain chromaticity value is determined in order to realize the target, the chromaticity value is also changed to a changed grayscale value. According to an embodiment of the disclosure, by using grayscale-chromaticity modeling and grayscale-luminance modeling, a luminance value corresponding to a changed chromaticity value may be determined again to determine a luminance value for realizing a target.

A series of processes of determining a second luminance value may be iterated a predefined number of times, and may be iterated until the difference between the reference chromaticity value and the second chromaticity value or the difference between the reference luminance value and the second luminance value is less than or equal to a threshold value.

Grayscale-chromaticity and grayscale-luminance modeling methods may include a method of measuring all chromaticity values and luminance values corresponding to all grayscale values (0 to 255), or measuring a chromaticity value and a luminance value corresponding to a certain grayscale value and interpolating chromaticity values and luminance values corresponding to the remaining grayscale values. In addition, the grayscale-chromaticity modeling and the grayscale-luminance modeling may be different for each element.

Figure 8A:
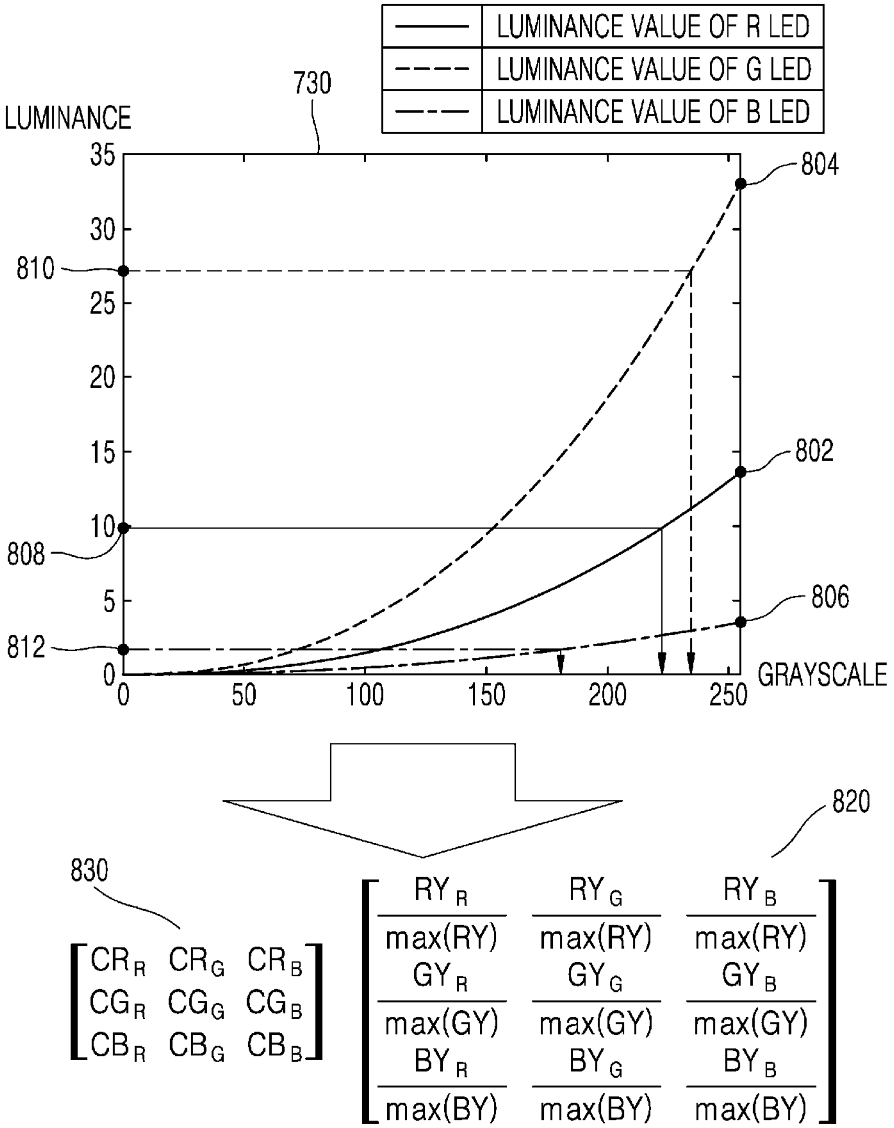
FIG. 8A is a diagram illustrating an example of determining chromaticity and luminance calibration coefficients based on a determined luminance value, according to an embodiment of the disclosure.

FIG. 8A is a diagram illustrating an example of determining chromaticity and luminance calibration coefficients based on a determined luminance value, according to an embodiment of the disclosure.

Referring to FIG. 8A, the processor 120 may finally determine the second luminance value for realizing the target 722. For example, the processor 120 may determine a second luminance value 808 of an R LED, a second luminance value 810 of a G LED, and a second luminance value 812 of a B LED for realizing the target 722.

When the second luminance values are determined, the processor 120 may determine chromaticity and luminance calibration coefficients for realizing the target, from the second luminance values 808, 810, and 812 of the R LED, the G LED, and the B LED. Here, when the target is a target R color, the calibration coefficients include three elements. In detail, when the target is the target R color, the three elements may be the ratio of the second luminance value 808 of the R LED to a luminance value 802 corresponding to the maximum grayscale value of the R LED, the ratio of the second luminance value 810 of the G LED to a luminance value 804 corresponding to the maximum grayscale value of the R LED, and the ratio of the second luminance value 812 of the R LED to a luminance value 806 corresponding to the maximum grayscale value of the R LED.

The processor 120 may determine second luminance values for realizing a target R color, a target G color, and a target B color. Accordingly, the processor 120 may determine a total of nine elements for configuring the calibration coefficients. When the nine elements are determined, the processor 120 may determine chromaticity and luminance calibration coefficients for realizing the target, and at this time, the calibration coefficients may be in the form of a 3×3 matrix 820.

In the matrix 820, max(RY) may denote a luminance value 802 corresponding to the maximum grayscale value of the R LED, max(GY) may denote a luminance value 804 corresponding to the maximum grayscale value of the G LED, and max(BY) may denote a luminance value 806 corresponding to the maximum grayscale value of the B LED. In addition, when the determined second luminance values are related to the target R color, $RY_R$ may denote the determined second luminance value 808, $GY_R$ may denote the determined second luminance value 810, and $BY_R$ may denote the determined second luminance value 812. The first column of the matrix 820 represents calibration coefficients for realizing the target R color. Similarly, in the matrix 820, the second column may represent calibration coefficients for realizing the target G color, and the third column may represent calibration coefficients for realizing the target B color.

A matrix 830 is a simplified representation of the matrix 820. Accordingly, the matrix 830 may correspond to the chromaticity and luminance calibration coefficients (i.e., matrix 820) for realizing the target. In the disclosure, the calibration coefficients may be represented by a 3×3 matrix and may include the ratio of a finally determined luminance value to a luminance corresponding to the maximum grayscale value, but this is for matching them with a calibration framework of elements for uniformity calibration, and thus the disclosure is not necessarily limited thereto.

Figure 8B:
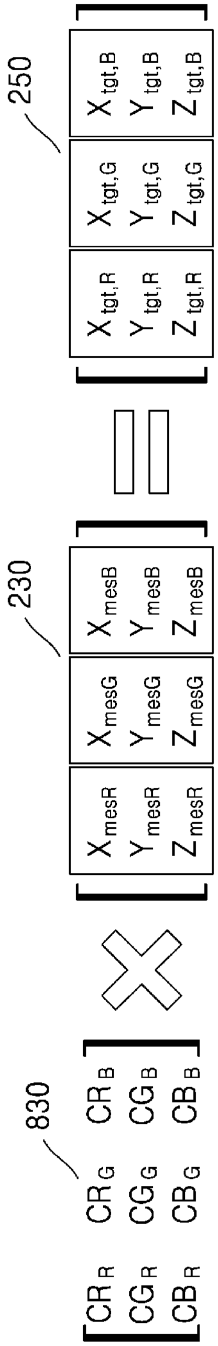
FIG. 8B is a diagram illustrating an example of applying calibration coefficients to chromaticity and luminance components of an element, according to an embodiment of the disclosure.

FIG. 8B is a diagram illustrating an example of applying calibration coefficients to chromaticity and luminance components of an element, according to an embodiment of the disclosure.

Referring to FIG. 8B, when the calibration coefficients are determined, the processor 120 may calibrate the uniformity by applying the calibration coefficients to the chromaticity and luminance components of a pixel value corresponding to the element. One way of applying the calibration coefficients is to perform matrix multiplication on the calibration coefficient matrix (i.e., matrix 830) and the matrix 230 related to the measured current chromaticity values and luminance values of the R LED, the G LED, and the B LED, as shown in FIG. 8B. The matrix 250 related to the calibrated chromaticity and luminance components of the R LED, the G LED, and the B LED may be determined as a result of the matrix multiplication. The first column of the matrix 250 may represent ocular response values with respect to the calibrated chromaticity value and luminance value of the R LED, the second column may represent ocular response values with respect to the calibrated chromaticity value and luminance value of the G LED, and the third column may represent ocular response values with respect to the calibrated chromaticity value and luminance value of the B LED. In addition, by adding the rows of the matrix 250 together, ocular response values with respect to the chromaticity value and the luminance value of the target white 240 may be determined.

According to embodiments of the disclosure, considering a situation in which both luminance and chromaticity are changed, in order to perform uniformity calibration of elements, calibration coefficients for each element are calculated for all pixels, the calibration coefficients are applied to image signals, and thus, the uniformity of the elements of a display device may be calibrated.

Various embodiments of the disclosure may be implemented as software including one or more instructions stored in a storage medium (e.g., the memory 110) that is readable by a machine (e.g., the display device 100 or a computer). For example, a processor (e.g., the processor 120) of a device may call and execute at least one of the stored one or more instructions from the storage medium. This enables the device to be operated to perform at least one function according to the called at least one instruction. The one or more instructions may include code generated by a compiler or code executable by an interpreter. The machine-readable storage medium may be provided in the form of a non-transitory storage medium. The term 'non-transitory' merely means that the storage medium does not refer to a transitory electrical signal but is tangible, and does not distinguish whether data is stored semi-permanently or temporarily on the storage medium.

According to an embodiment, the method according to various embodiments disclosed herein may be included in a computer program product and provided. The computer program product may be traded between a seller and a purchaser as a commodity. The computer program product may be distributed in the form of a machine-readable storage medium (e.g., compact disk read only memory (CD-ROM)), or may be distributed online (e.g., downloaded or uploaded) through an application store (e.g., Play Store™) or directly between two user devices (e.g., smart phones). In the case of online distribution, at least a portion of the computer program product may be temporarily stored in a machine-readable storage medium such as a manufacturer's server, an application store's server, or a memory of a relay server.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of controlling a pixel of a display device, the method comprising:

determining a first chromaticity value corresponding to a first grayscale value of the pixel using a grayscale-chromaticity modeling performed by measuring a chromaticity value corresponding to a grayscale value input to each pixel;

determining a first luminance value corresponding to the first chromaticity value, based on the first chromaticity value and a target value that is an ocular response value with respect to chromaticity and luminance components of light outputs from a R LED, a G LED, and a B LED for realizing a target white;

determining a second grayscale value corresponding to the first luminance value using a grayscale-luminance modeling performed by measuring a luminance value corresponding to a grayscale value input to the each pixel;

determining a second chromaticity value corresponding to the second grayscale value using the grayscale-chromaticity modeling;

determining a second luminance value corresponding to the second chromaticity value, based on the second chromaticity value and the target value; and determining chromaticity and luminance calibration coefficients including a ratio of the second luminance value to a luminance value corresponding to a maximum grayscale value, based on the second luminance value, wherein the chromaticity and luminance calibration coefficients are represented by a 3×3 matrix and determined by individually considering a grayscale-chromaticity relationship and a grayscale-luminance relationship.

2. The method of claim 1, further comprising applying the chromaticity and luminance calibration coefficients to chromaticity and luminance components of a pixel value corresponding to the pixel.

3. The method of claim 1, wherein the chromaticity and luminance calibration coefficients comprise a ratio of the second luminance value to a luminance corresponding to a maximum grayscale value.

4. The method of claim 1, wherein the determining of the first chromaticity value comprises determining the first chromaticity value corresponding to the first grayscale value by using grayscale-chromaticity modeling.

5. The method of claim 1, wherein the determining of the second grayscale value comprises determining the second grayscale value corresponding to the first luminance value by using grayscale-luminance modeling.

6. The method of claim 1, wherein the determining of the chromaticity and luminance calibration coefficients is performed a predefined number of times.

7. The method of claim 1, wherein the determining of the chromaticity and luminance calibration coefficients is performed until a difference between a reference chromaticity value and the second chromaticity value or a difference between a reference luminance value and the second luminance value is less than or equal to a threshold value.

8. A display device comprising:

a memory; and at least one processor, wherein the at least one processor is configured to:

determine a first chromaticity value corresponding to a first grayscale value of a pixel of the display device using a grayscale-chromaticity modeling performed by measuring a chromaticity value corresponding to a grayscale value input to each pixel, determine a first luminance value corresponding to the first chromaticity value, based on the first chromaticity value and a target value that is an ocular response value with respect to chromaticity and luminance components of light outputs from a R LED, a G LED, and a B LED for realizing a target white, determine a second grayscale value corresponding to the first luminance value using a grayscale-luminance modeling performed by measuring a luminance value corresponding to a grayscale value input to the each pixel, determine a second chromaticity value corresponding to the second grayscale value using the grayscale-chromaticity modeling, determine a second luminance value corresponding to the second chromaticity value, based on the second chromaticity value and the target value, and determine chromaticity and luminance calibration coefficients including a ratio of the second luminance value to a luminance value corresponding to a maximum grayscale value, based on the second luminance value, wherein the chromaticity and luminance calibration coefficients are represented by a 3×3 matrix and determined by individually considering a grayscale-chromaticity relationship and a grayscale-luminance relationship.

9. The display device of claim 8, wherein the at least one processor is further configured to apply the chromaticity and luminance calibration coefficients to chromaticity and luminance components of a pixel value corresponding to the pixel.

10. The display device of claim 8, wherein the chromaticity and luminance calibration coefficients comprise a ratio of the second luminance value to a luminance corresponding to a maximum grayscale value.

11. The display device of claim 8, wherein the at least one processor is further configured to determine the first chromaticity value corresponding to the first grayscale value by using grayscale-chromaticity modeling.

12. The display device of claim 8, wherein the at least one processor is further configured to determine the second grayscale value corresponding to the first luminance value by using grayscale-luminance modeling.

13. The display device of claim 8, wherein the at least one processor is further configured to determine the chromaticity and luminance calibration coefficients a predefined number of times.

14. The display device of claim 8, wherein the at least one processor is further configured to determine the chromaticity and luminance calibration coefficients until a difference between a reference chromaticity value and the second chromaticity value or a difference between a reference luminance value and the second luminance value is less than or equal to a threshold value.

15. A non-transitory computer-readable recording medium storing instructions for controlling a pixel of a display device, the instructions causing the display device to:

determine a first chromaticity value corresponding to a first grayscale value of the pixel using a grayscale-chromaticity modeling performed by measuring a chromaticity value corresponding to a grayscale value input to each pixel;

determine a first luminance value corresponding to the first chromaticity value, based on the first chromaticity value and a target value that is an ocular response value with respect to chromaticity and luminance components of light outputs from a R LED, a G LED, and a B LED for realizing a target white;

determine a second grayscale value corresponding to the first luminance value using a grayscale-luminance modeling performed by measuring a luminance value corresponding to a grayscale value input to the each pixel;

determine a second chromaticity value corresponding to the second grayscale value using the grayscale-chromaticity modeling;

determine a second luminance value corresponding to the second chromaticity value, based on the second chromaticity value and the target value; and determine chromaticity and luminance calibration coefficients including a ratio of the second luminance value to a luminance value corresponding to a maximum grayscale value, based on the second luminance value, wherein the chromaticity and luminance calibration coefficients are represented by a 3×3 matrix and determined by individually considering a grayscale-chromaticity relationship and a grayscale-luminance relationship.

* * * * *